(12) United States Patent
Kojima et al.

(10) Patent No.: US 6,575,681 B2
(45) Date of Patent: Jun. 10, 2003

(54) RESIN CLIP

(75) Inventors: Tsutomu Kojima, Kanagawa-ken (JP); Kazunori Asano, Kanagawa-ken (JP)

(73) Assignee: Piolax Inc., Kanagawa-ken (JP)

( * ) Notice: Subject to any disclaimer, the term of this patent is extended or adjusted under 35 U.S.C. 154(b) by 0 days.

(21) Appl. No.: 10/096,787

(22) Filed: Mar. 14, 2002

(65) Prior Publication Data

US 2002/0131846 A1 Sep. 19, 2002

(30) Foreign Application Priority Data

Mar. 19, 2001 (JP) ........................................ 2001-077393

(51) Int. Cl.[7] .......................... F16B 19/00; F16B 37/04
(52) U.S. Cl. ..................... 411/508; 411/182; 411/510; 411/913; 24/297
(58) Field of Search .............................. 411/508, 509, 411/510, 182, 908, 913; 24/297

(56) References Cited

U.S. PATENT DOCUMENTS

| 4,787,795 A | 11/1988 | Kraus |
| 5,448,809 A | 9/1995 | Kraus |
| 5,592,719 A | 1/1997 | Eto et al. |
| 5,947,631 A | * 9/1999 | Hironaka et al. ....... 411/508 X |
| 5,975,820 A | * 11/1999 | Kirchen ................. 411/510 X |

FOREIGN PATENT DOCUMENTS

| EP | 0764788 | 3/1997 |
| GB | 2205892 | 12/1988 |
| JP | 2818138 | 8/1998 |

OTHER PUBLICATIONS

English LanguageAbstract for JP Appl. No. 2818138.

* cited by examiner

*Primary Examiner*—Neill Wilson
(74) *Attorney, Agent, or Firm*—Greenblum & Bernstein, P.L.C.

(57) ABSTRACT

A resin clip includes a head for abutting on one surface of a panel upon insertion into an attachment hole thereof, a pillar extending from the center of the head, and a pair of elastic legs folded back at a tip portion of the pillar toward the head and spreading out in a V shape. Locking parts in shapes of multiple steps are formed outside the elastic leg. In addition, one side in a width direction inside the elastic leg is more protruded toward the pillar than the other side, and the pillar includes a dented portion for receiving the protruded portion.

7 Claims, 5 Drawing Sheets

RESIN CLIP

BACKGROUND OF THE INVENTION

1. Field of the Invention

The present invention relates to a resin clip which is fitted into an attachment hole of a panel to be put on an automobile or the like, the resin clip being used for fixing a hose or a wire harness to a panel or for joining panels together. Specifically, the present invention relates to a resin clip designed as adaptable to a panel when a board thickness of the panel is varied within a certain range.

2. Description of the Related Art

On a panel constituting a body or an interior of an automobile, provided is an attachment hole for fixing various parts such as a hose or a wire harness thereto or for joining panels together. Then, a resin clip is fitted into this attachment hole, whereby the various parts are attached or the panels are joined together through this resin clip.

The above-described resin clip generally includes a head of a flange shape for abutting on one surface of a panel, a pillar extending from the center of one surface of this head, and a pair of elastic legs folded back from a tip portion of this pillar toward the head so as to spread and extend in a V shape. On an outer surface of each elastic leg, formed are locking parts of stepped shapes for engagement with an aperture edge of the attachment hole.

Moreover, when the pillar and the elastic legs are inserted into the attachment hole from the tip side thereof, the elastic legs pass through the attachment hole in mid-course by flexing themselves inward. When the head abuts on one surface of the panel, the locking parts of the elastic legs are engaged with the aperture edge on the other surface of the panel. Accordingly, the aperture edge of the attachment hole of the panel is sandwiched and supported between the head and the locking parts of the elastic legs, whereby the resin clip is fitted into the attachment hole.

In this case, as shown in Japanese Patent No. 2818138, for example, also known is a resin clip in which the locking parts of stepped shapes are provided in pluralities on outer surfaces of the elastic legs so as to adapt to a panel if a board thickness thereof is varied. According to this patent, the locking part provided on a tip side of the elastic leg is engaged with an aperture edge of a panel in case that the panel is thin, and the locking part provided on a base end side of the elastic leg is engaged with an aperture edge of a panel in case that the panel is thick. In this way, it is possible to adopt and fit the same clip onto a plurality of panels with various board thicknesses.

SUMMARY OF THE INVENTION

However, in the resin clip as shown in Japanese Patent No. 2818138 which are made adaptable to the plurality of panels with various board thicknesses, it is necessary to thicken the elastic legs because the locking parts in shapes of multiple steps are provided on the outer surfaces of the elastic legs. As a result, the elastic legs become more difficult to be contracted in diameter because of interference with the pillar when the elastic legs are flexed inward. Accordingly, there has been a problem that the above-described resin clip is not applicable when an attachment hole of a panel has a small inside diameter.

Therefore, an object of the present invention is to provide a resin clip which is made adaptable to a plurality of panels with various board thicknesses and applicable when an attachment hole of a panel is relatively small.

In order to achieve the foregoing object, a first aspect of the present invention is a resin clip to be fitted into an attachment hole provided on a panel, which includes a head to be engaged with one surface of the panel, a pillar extending from the head to be inserted into the attachment hole, a pair of elastic legs which are folded back at a tip portion of the pillar toward the head and spreading in a V shape, and locking parts formed outside the elastic leg in shapes of multiple steps. Here, one side in a width direction inside the elastic leg protrudes toward the pillar more than another side, and a portion of the pillar facing a protruded portion of the elastic leg is dented so as to receive the protruded portion of the elastic leg.

According to the above-described first aspect, one side of the elastic leg protrudes toward the pillar, and a dent is formed on the pillar for receiving the protruded portion. For this reason, the elastic leg becomes less interfering with the pillar when the elastic leg is flexed inward, whereby it is possible to contract the elastic leg smaller in diameter. Moreover, it is possible to secure a sufficient thickness for the elastic leg by use of the portion which enters the dent of the pillar, whereby it is possible to form the locking parts into shapes of multiple steps so that the resin clip is adaptable to a plurality of panels with various board thicknesses. In addition, the pillar is not entirely thinned but is formed into a shape where only one part thereof is dented. Accordingly, strength of the pillar can be maintained. Furthermore, a width of the elastic leg is secured as wide as possible so that only one side of the elastic leg is rendered protruding to enter the dent of the pillar. Accordingly, strength of the elastic leg can be also maintained.

Moreover, a second aspect of the present invention is the resin clip according to the first aspect, in which only one side at a tip side of the elastic leg corresponding to the protruded portion in the width direction of the elastic leg extends and becomes narrower in the width thereof, and the locking parts are formed into multiple steps throughout a wide portion of the elastic leg at a base end side thereof and a narrow portion at the tip side thereof.

According to the above-described aspect, it is possible to substantially contract the elastic leg in diameter such that the narrowed side of the elastic leg is buried in the dented portion of the pillar. In the meantime, strength of the elastic leg can be also maintained by widening the elastic leg on the base end side thereof. Moreover, by securing a sufficient thickness from the tip side of the elastic leg to the base end side thereof, the number of the steps of the locking parts can be increased as many as necessary.

A third aspect of the present invention is the resin clip according to the first aspect, in which a boundary between the dented portion and an undented portion of the pillar and/or a boundary between the protruded portion and an unprotruded portion inside the elastic leg form cross sections of tapered shapes.

According to the above-described third aspect, the protruded portion of the elastic leg can be prevented from interfering with the stepped portion of the pillar by jamming when the elastic leg is flexed inward, whereby the elastic leg can be surely contracted in diameter. In addition, the width of the protruded portion of the elastic leg is secured as wide as possible, whereby strength of the elastic leg can be maintained.

A fourth aspect of the present invention is to provide the resin clip according to the first aspect, in which a centerline in a thickness direction of a cross section of the pillar forms an approximately straight line at a tip portion of the pillar, and the centerline forms a shape largely bent as a step in mid-course along with approaching toward the base end portion of the pillar.

According to the present invention, it is possible to form the dented portion on one side so as to allow the protruded portion inside the elastic leg to be inserted thereinto while maintaining the thickness of the pillar constant from the tip portion to the base end portion thereof. Therefore, it is possible to form the dented portion while maintaining sufficient strength of the pillar.

In the present invention, it is preferable that the head is composed of a flange spreading out like a skirt toward a direction of the pillar, and notches are formed in multiple positions on a periphery of the flange. In this way, the flange can elastically support the panel by sandwiching. In addition, it is possible to secure an elastic flexure amount sufficiently with the notches provided on the periphery of the flange.

BRIEF DESCRIPTION OF THE DRAWINGS

FIG. 7A shows a case of fitting the resin clip into a thin panel, FIG. 7B shows a case of fitting the resin clip into a panel thicker than the panel of FIG. 7A, and FIG. 7C shows a case of fitting the resin clip into a panel thicker than the panel of FIG. 7B.

DESCRIPTION OF THE PREFERRED EMBODIMENT

Figure 1:
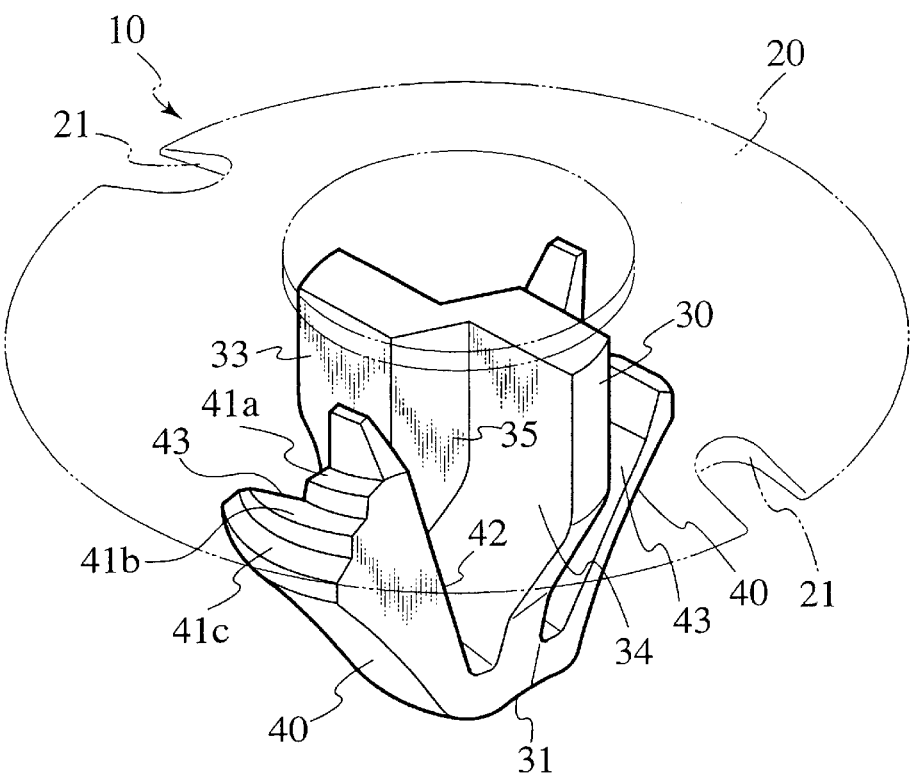
FIG. 1 is a perspective view showing one embodiment of a resin clip according to the present invention.
Figure 2:
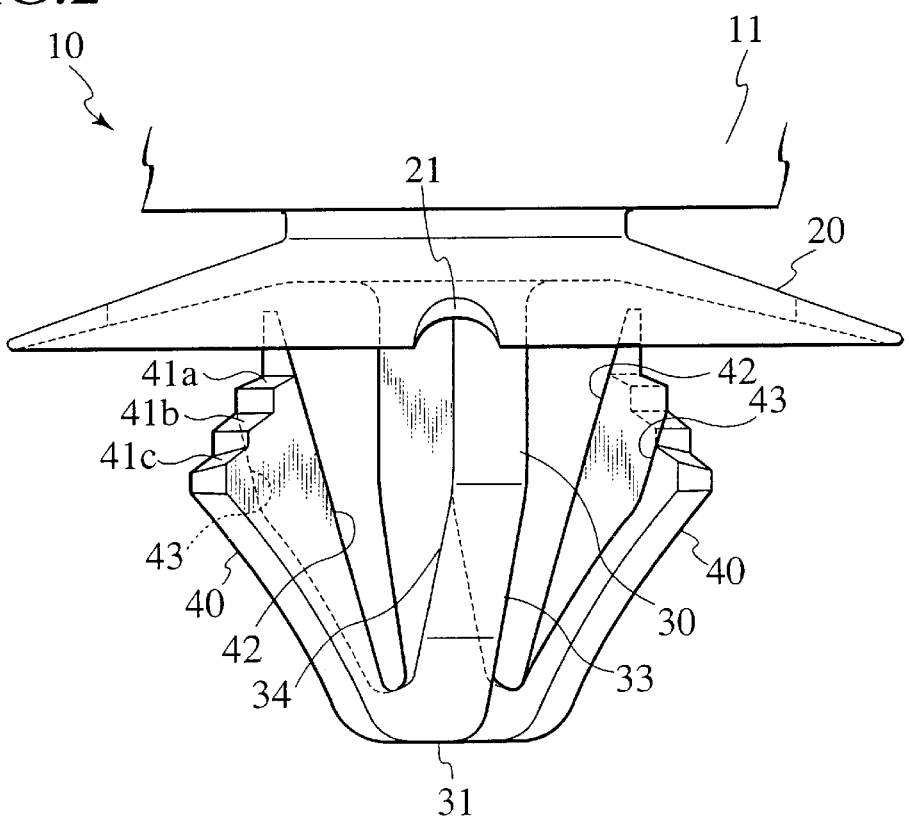
FIG. 2 is a front view of the resin clip.
Figure 3:
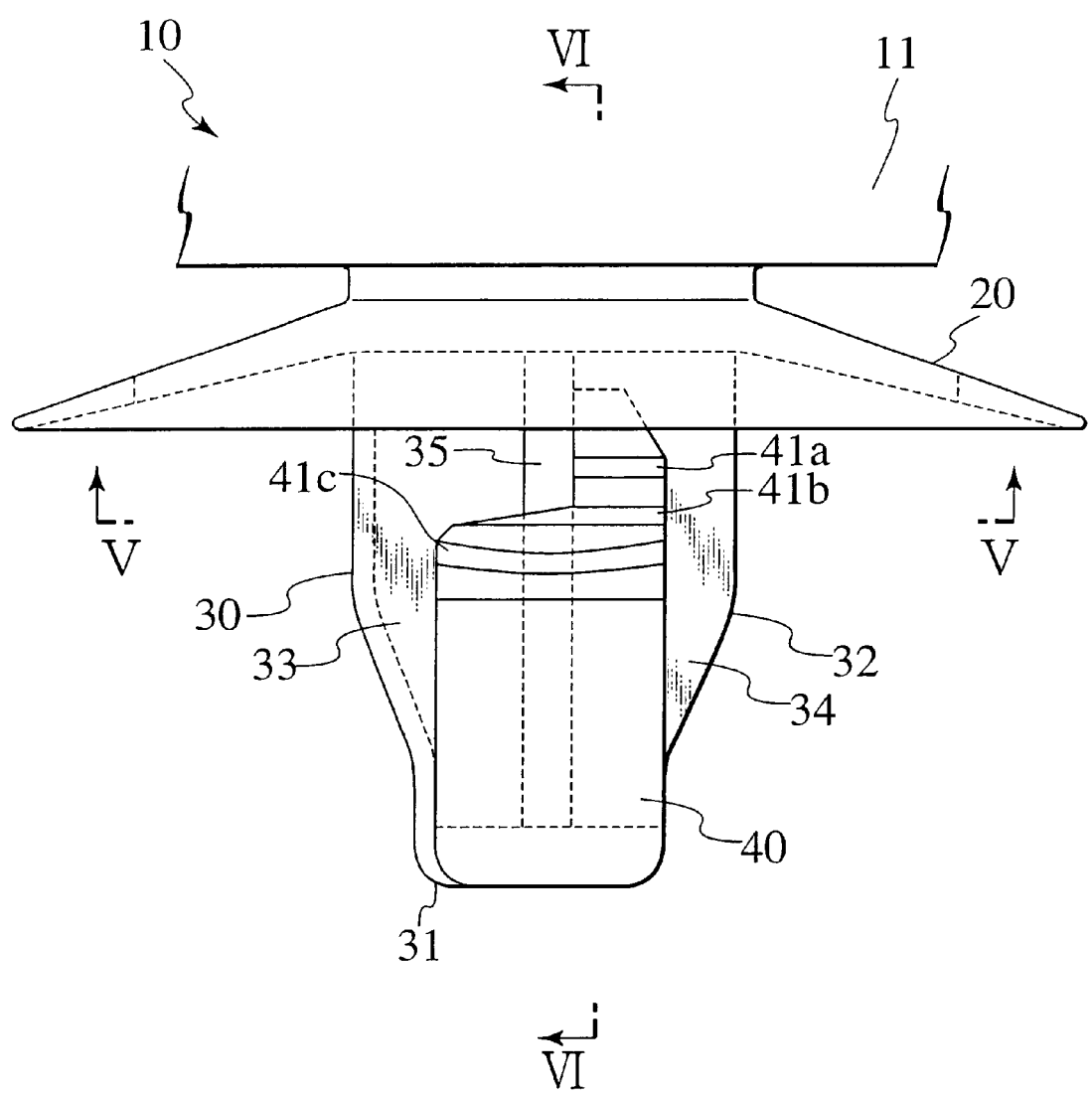
FIG. 3 is a side view of the resin clip.
Figure 4:
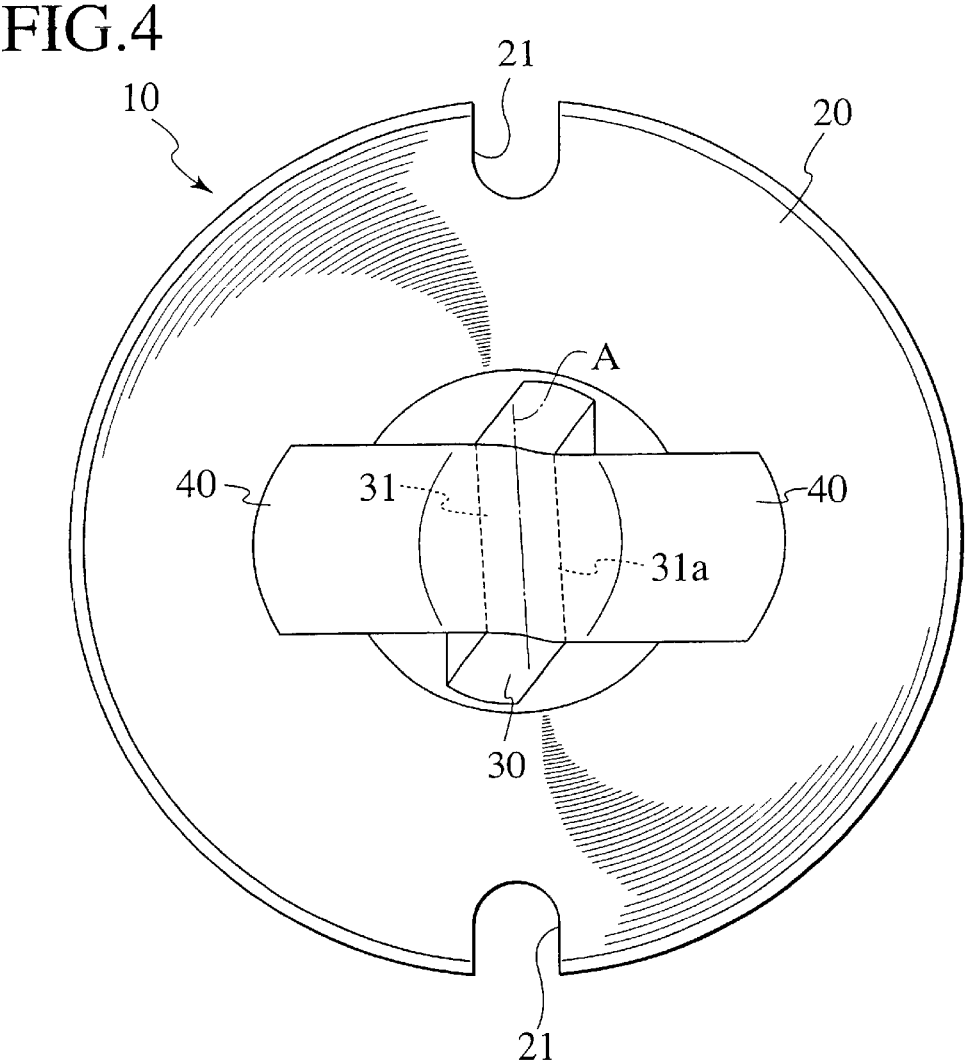
FIG. 4 is a bottom plan view of the resin clip.
Figure 5:
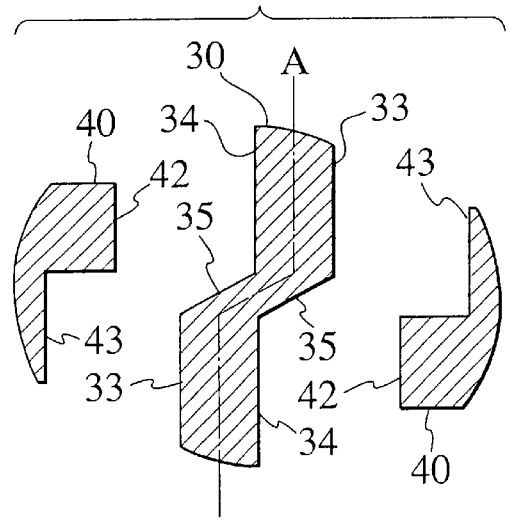
FIG. 5 is a cross-sectional view taken along a V—V line of FIG. 3.
Figure 6:
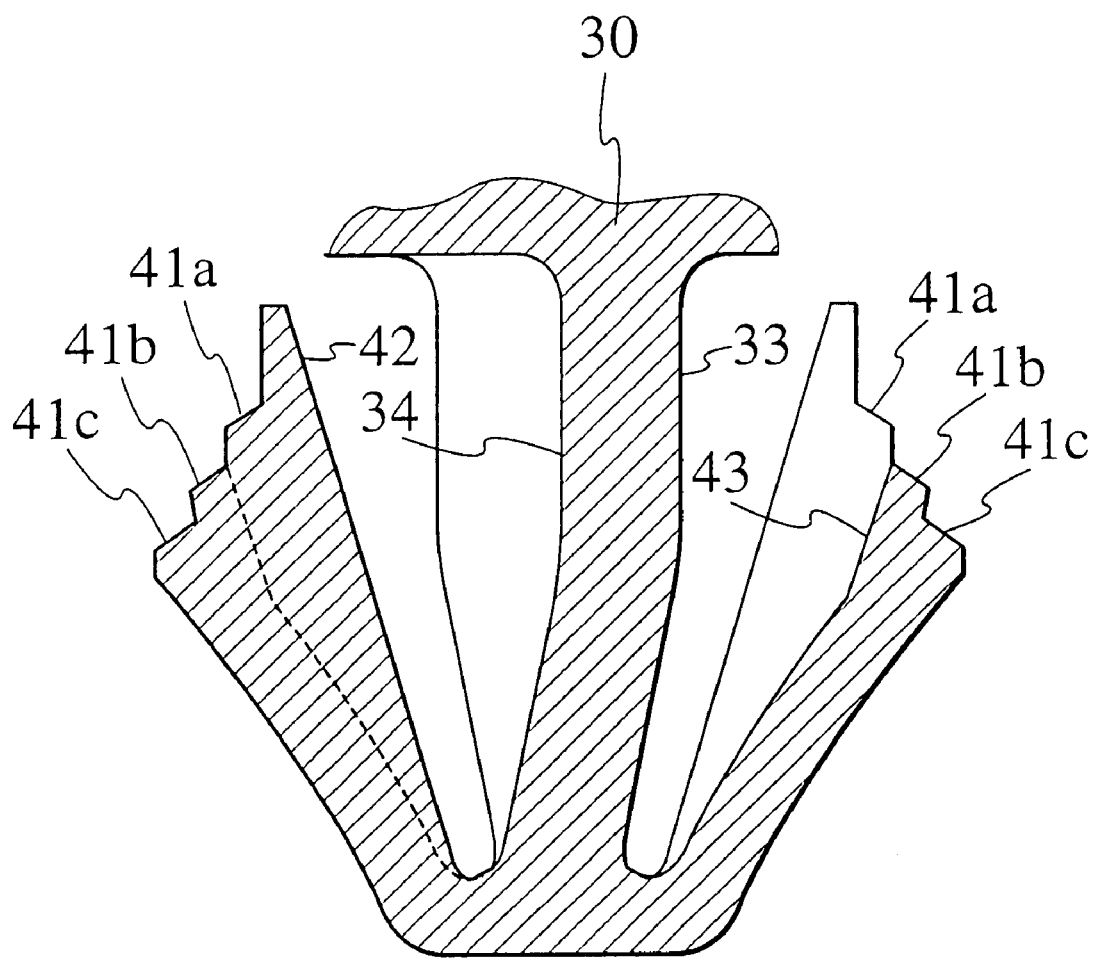
FIG. 6 is a cross-sectional view taken along a VI—VI line of FIG. 3.
Figure 7A:
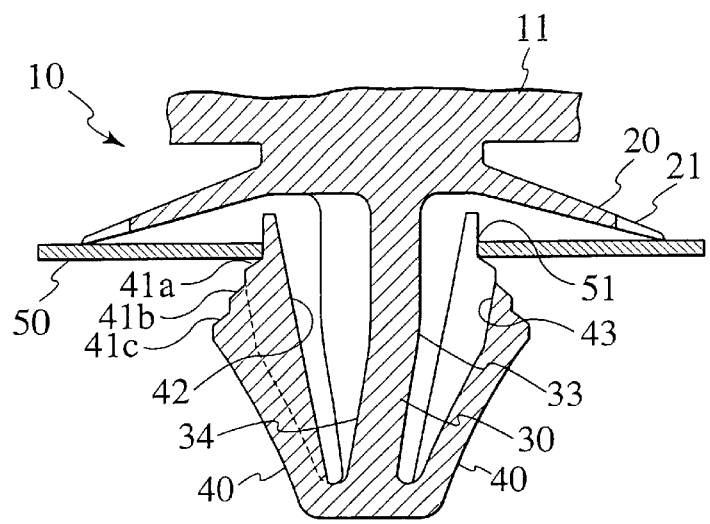
FIGS. 7A to 7C are cross-sectional views for showing states of fitting the resin clip into a plurality of panels with various board thicknesses. In particular.
Figure 7B:
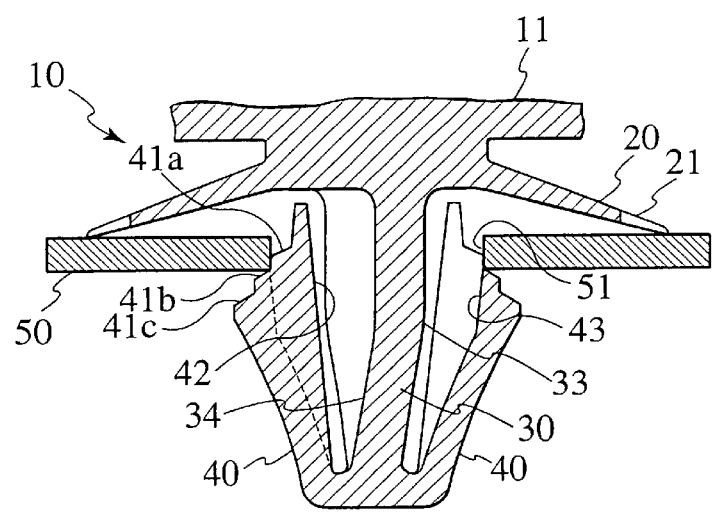
Figure 7C:
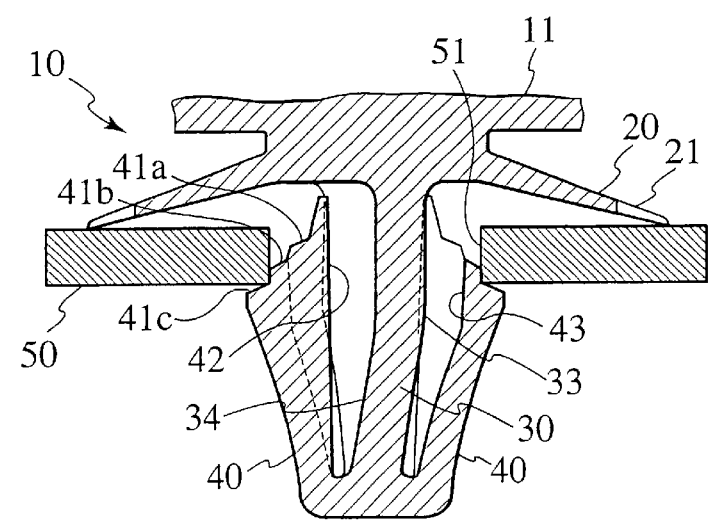

FIGS. 1 to 7C collectively show one embodiment of a resin clip according to the present invention. In particular, FIG. 1 is a perspective view showing the resin clip; FIG. 2 is a front view of the resin clip; FIG. 3 is a side view of the resin clip; FIG. 4 is a bottom plan view of the resin clip; FIG. 5 is a cross-sectional view taken along a V—V line of FIG. 3; FIG. 6 is a cross-sectional view taken along a VI—VI line of FIG. 3; and FIGS. 7A to 7C are cross-sectional views for showing states of fitting the resin clip into a plurality of panels with various board thicknesses.

This resin clip 10 is composed of an unillustrated body, a flange 20 connected with this body and spreading out like a skirt, a pillar 30 extending out of a central portion of this flange 20 in a direction opposite to the body, and a pair of elastic legs 40 and 40 folded back from a tip portion 31 of this pillar 30 toward the flange 20 and spreading in a V shape.

A clamp, a holder or the like is integrally formed with the body for fixing various parts such as a hose and a wire harness, for example. In this way, a shape of the body can be appropriately set in line with a purpose of usage.

The flange 20 is provided for abutting on a periphery of an attachment hole on one surface of the panel in order to support the panel by sandwiching between the flange 20 and the elastic legs 40. The flange 20 corresponds to a head in the present invention. As the flange 20 is formed into a spreading shape like a skirt, the flange 20 abuts on the panel in an elastically compressed state, whereby the flange 20 absorbs unevenness of a board thickness. Meanwhile, the flange 20 is elastically pressed against the panel, thus contributing prevention of looseness.

In this embodiment, U-shaped notches 21 are formed in two opposite positions on the periphery of the flange 20. The notches 21 are provided for securing a sufficient compressible length of the flange 20. In this way, the resin clip is made more adaptable to unevenness of the panel thickness and the like. Note that the notches 21 are not limited to U shapes, but the notches 21 may be in V shapes or may be simple slits.

It should be noted that the flange 20 is not limited to the case to be engaged directly with the periphery of the attachment hole of the panel by abutting thereon, but the flange 20 may be engaged indirectly with the periphery of the attachment hole of the panel via another member while interposing another member between the panel and the flange 20. In that case, another member is sandwiched and fixed between the panel and the flange 20.

The pillar 30 is formed into a plate as a whole, and as shown in FIG. 3, a base end side thereof adjacent to the flange 20 is formed widely, and a width of the pillar 30 is formed as gradually decreasing from a middle portion 32 toward the tip portion 31 thereof. Moreover, regarding both surfaces of the plate body, one side thereof is protruded and the other side is dented, whereby a boundary between a protruded portion 33 and a dented portion 34 forms an inclined plane 35 of a tapered shape. In addition, a back side of the protruded portion 33 of the one side forms the dented portion 34 of the other side, and a back side of the dented portion 34 of the one side forms the protruded portion 33 of the other side. According to the above-described formation, a thickness of the pillar 30 is made constant except portions of the inclined planes 35.

Moreover, whereas a reference numeral 31a in FIG. 4 denotes a cross section of the tip portion 31, a centerline A of the cross section in a thickness direction thereof is formed as an approximately straight line. However, as shown in FIG. 5, in a cross section of the pillar 30 at a portion closer to the base end (a portion closer to the flange 20), the centerline A in the thickness direction is bent like a step in mid-course. In this way, the protruded portion 33 and the dented portion 34 are formed in a manner that the step gaps grow larger toward the base end side.

The pair of elastic legs 40 and 40 are folded back at the tip portion 31 of the pillar 30 toward the flange 20 and are collectively formed into a shape spreading like a letter V. Moreover, each of the elastic legs 40 includes stepped locking parts 41a, 41b and 41c on an upper outer surface thereof. Furthermore, one side inside each elastic leg 40 forms a protruded portion 42 protruded in a direction of the pillar 30 and another side thereof forms a thin portion 43.

Moreover, a tip portion of the elastic leg 40 extends out and is narrowed only at a portion corresponding to this protruded portion 42, meanwhile, a base end side of the elastic leg 40 is made wide. The locking part 41a located closest to the flange 20 is formed at the narrowed portion. The locking parts 41b and 41c which are more distant from the flange 20 are formed at the wide portion on the base end side.

Therefore, when the elastic legs 40 and 40 are flexed inward, the protruded portions 42 are buried in the dented portions 34 of the pillar 30, whereby the thin portions 43 abut on the protruded portions 33 of the pillar 30. As a result, it is possible to secure a sufficient diametrical contraction amount when the elastic legs 40 and 40 are flexed inward, whereby the resin clip can be inserted into an attachment hole of a relatively small inside diameter. Moreover, since widths of the elastic legs 40 and 40 on the base end side can be sufficiently secured, it is possible to maintain strength thereof.

Furthermore, it is necessary to secure a sufficient thickness of the elastic leg 40 regarding the upper portion thereof, on which the locking parts 41a, 41b and 41c are formed. Accordingly, one side of the elastic leg 40 is protruded inward. In this way, it is possible to form the plurality of stepped locking parts while securing the above-described thickness. In addition, since the protruded portion 33 and the dented portion 34 of the pillar 30 are formed in a manner that the step gaps grow larger toward the base end side as described above, the upper portion of the elastic leg 40 can be buried in the dented portion 34 even if the upper portion is formed thick.

Meanwhile, as described above, the base end side of the pillar 30 adjacent to the flange 20 is formed wide and the width of the pillar 30 is formed as gradually decreasing from the middle portion 32 toward the tip portion 31. Since the elastic legs 40 spread out in the V shape toward the flange 20 while the tip portion thereof is contracted, the pillar 30 and the tip portions of the elastic legs 40 of the clip can be easily inserted into the attachment hole of the panel.

Next, description will be made regarding usage of the resin clip 10.

As shown in FIGS. 7A to 7C, when the pillar 30 and the tip portions of the elastic legs 40 of the resin clip 10 are inserted and gradually pushed into an attachment hole 51 of a panel 50, the elastic legs 40 are flexed inward and contracted in diameter, thus gradually passing through the attachment hole 51. In this event, the protruded portion 42 on the one side of each elastic leg 40 is buried in the dented portion 34 of the pillar 30, and the thin portion 43 on the other side of the elastic leg 40 approximates the protruded portion 33 of the pillar 30. As a result, the elastic legs 40 can be largely contracted in diameter, whereby the elastic legs 40 can be inserted if an inside diameter of the attachment hole 51 is relatively small.

When the pillar 30 and the elastic legs, 40 of the resin clip 10 are inserted into the attachment hole 51 of the panel 50, the flange 20 is spread and pressed elastically on the periphery of the attachment hole 51 on one surface of the panel 50. In this event, the notches 21 formed on the periphery of the flange 20 facilitate the flange 20 to spread out, whereby adaptability to a board thickness of the panel 50 can be enhanced.

After inserting the pillar 30 and the elastic legs 40 of the resin clip 10 into the attachment hole 51, the resin clip 10 is pushed against the panel 50 until the flange 20 cannot spread any wider, and then a hand is taken off the resin clip 10. Then, the pillar 30 and the elastic legs 40 start going back in an extracting direction from the attachment hole 51 owing to elasticity of the flange 20. However, since any one of the locking parts 41a, 41b and 41c provided on the elastic leg 40 is engaged with an aperture edge of the attachment hole 51, the panel 50 is sandwiched and supported between the flange 20 and any one of the locking parts 41a, 41b and 41c, whereby the resin clip 10 is fixed to the panel 50.

In this case, since the plurality of stepped locking parts 41a, 41b and 41c are provided for engagement with the aperture edge of the attachment hole 51, any one of the locking portions is adapted to the thickness and thereby engaged. For this reason, the same resin clip 10 can be adapted to a plurality of panels 50 with various thicknesses.

For example, FIG. 7A shows a state that the resin clip 10 is fitted into a thin panel 50, in which the locking part 41a provided closest to the tip portion of the elastic leg 40 is engaged with the aperture edge of the attachment hole 51. Meanwhile, FIG. 7B shows a state that the resin clip 10 is fitted into a panel 50 of a medium thickness, in which the locking part 41b provided at a middle height of the elastic leg 40 is engaged with the aperture edge of the attachment hole 51. In addition, FIG. 7C shows a state that the resin clip 10 is fitted into a thick panel 50, in which the locking part 41c is engaged with the aperture edge of the attachment hole 51. Accordingly, it is possible to fit the resin clip 10 surely into the attachment hole 51 without looseness even if the thickness of the panel is varied.

What is claimed is:

1. A resin clip to be fitted into an attachment hole provided on a panel, said resin clip comprising:

a head to be engaged with one surface of the panel;

a pillar extending from the head to be inserted into the attachment hole;

a pair of elastic legs which are folded back at a tip portion of the pillar toward the head and spreading in a V shape; and locking parts formed outside the elastic leg in shapes of multiple steps, wherein one side in a width direction inside the elastic leg protrudes toward the pillar more than another side thereof, and a portion of the pillar facing a protruded portion of the elastic leg is dented so as to receive the protruded portion of the elastic leg.

2. The resin clip according to claim 1, wherein only one side at a tip side of the elastic leg corresponding to the protruded portion in the width direction of the elastic leg extends and becomes narrower in the width thereof, and the locking parts are formed into multiple steps throughout a wide portion of the elastic leg at a base end side thereof and a narrow portion of the elastic leg at the tip side thereof.

3. The resin clip according to claim 1, wherein a boundary between a dented portion and an undented portion of the pillar forms a cross section of a tapered shape.

4. The resin clip according to claim 1, wherein a boundary between the protruded portion and an unprotruded portion inside the elastic leg forms a cross section of a tapered shape.

5. The resin clip according to claim 1, wherein a boundary between the dented portion and an undented portion of the pillar and a boundary between the protruded portion and an unprotruded portion inside the elastic leg form cross sections of tapered shapes.

6. The resin clip according to claim 1, wherein a centerline in a thickness direction of a cross section of the pillar forms an approximately straight line at a tip portion of the pillar, and the centerline forms a shape largely bent in steps in mid-course along with approaching toward the base end portion of the pillar.

7. The resin clip according to claim 1, wherein the head has at least one notch.

* * * * *